Feb. 3, 1970   J. B. KRAELING ET AL   3,492,864
OMNIDIRECTIONAL FORCE TRANSDUCER MEASURING DEVICE
Filed April 21, 1967   5 Sheets-Sheet 1

INVENTORS
John B. Kraeling &
William D. Carothers
BY
Carothers & Carothers
THEIR ATTORNEYS

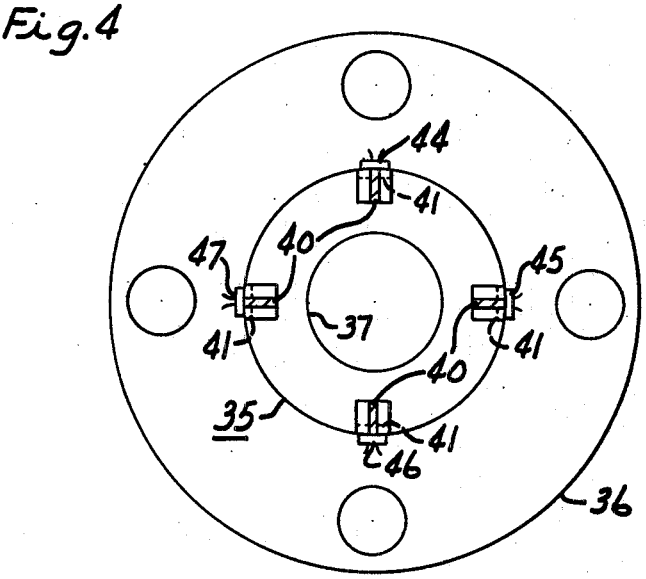
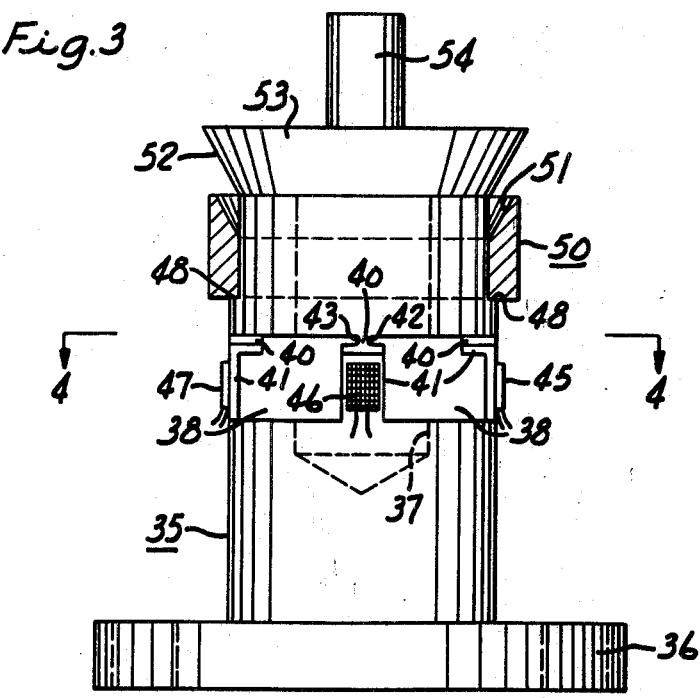

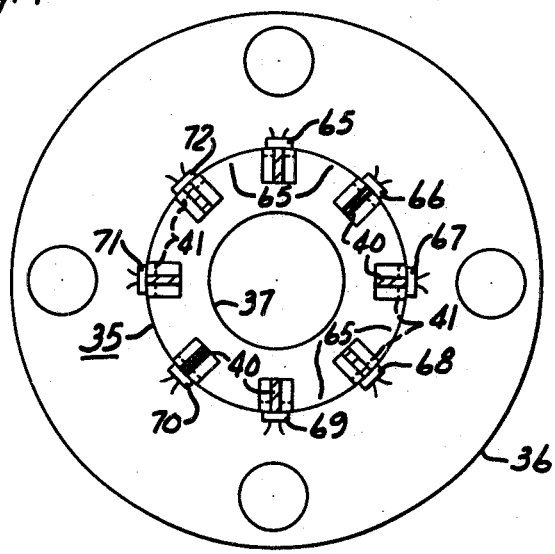

United States Patent Office 3,492,864
Patented Feb. 3, 1970

3,492,864
OMNIDIRECTIONAL FORCE TRANSDUCER MEASURING DEVICE
John B. Kraeling, 965 Beechwood Drive, Meadville, Pa. 16335, and William D. Carothers, Carnegie, Pa.; said Carothers assignor to said Kraeling
Filed Apr. 21, 1967, Ser. No. 632,789
Int. Cl. G01l 3/00, 5/12
U.S. Cl. 73—133
13 Claims

ABSTRACT OF THE DISCLOSURE

An extensometer device of a dynamometer type for measuring force in any direction or in a specific direction by transposing the force or summation of forces from a mechanical displacement system into an electrical system through a transducer with consistent accuracy in finite terms. A magnetic or electromagnetic clutch interposed between and actuated by the force to be measured to prevent limited maximum force measurements on the transducer which may harm the structure by distorting the transducer making it erratic in finite or extensometer measurements.

BACKGROUND OF INVENTION

This invention related generally to an extensometer measuring device of the dynamometer type wherein a push or pull force in any direction or in a specific direction may be accurately measured.

A principal use of force sensing devices is in weighing wherein semi-conductor load cells and magnetic type measuring devices are used to determine the weight as the factor being measured. In these devices only the vertical vector is employed as lateral or angular forces on load cells and magnetic cells can be destructive. The device is then designed to transmit only those forces parallel with the sensing direction or vertical and all the angular forces are absorbed.

Such a device has only one sensing direction. It is limited in what it can do. It cannot be sensitive for very small measurements.

SUMMARY

The principal object of this invention is the provision of an omnidirectional force transducer that may accurately measure single directional force or a summation of omnidirectional forces. These forces may be a factor or weight of an object that also has force in any direction. The force may be any summation of independent vectors or a compound of vector forces. It may be an arcuate force measured tangentially of the arcuate movement whether it is radial or following a curve.

The direction of the force may be determined as well as the resultant force to provide the vectors of the summation.

The support of this transducer protects the measuring cell or element and at the same time measures this desired force rather than only the forces parallel to the measurement desired as in the prior art. Different support constructions may be employed in different ways to obtain micro measurements in forces or reflected reactions. As such, this transducer may be actively connected to measure drift in terms of a force to correct the flight of an object and indirectly reduce the circuitry presently required to perform these functions. It may be employed with a gyratory head that rotates on the axis of the transducer which makes the force measurements applied thereto by mere change in direction of the moving body carrying the same. Such gyratory force pick-up is sensitive to slight changes in direction and the multiple transducer in the support charts the changes in direction and relays this information to a computer to signal the change and actuate a counter force to correct the same if required.

If the head of the support is connected into a diaphragm or a wheel type connector that transmits forces from any direction the multiple transducers read out the information as it occurs. The diaphragm may be a plate connected in a mechanical system that picks up the forces directly.

Other objects and advantages of this invention appear hereinafter in the following description and claims.

The accompanying drawings show, for the purpose of exemplification without limiting the invention or the claims thereto, certain practical embodiments illustrating the principles of this invention wherein:

FIG. 3 is a view in side elevation of a four cell cylindrical force measuring transducer comprising another embodiment of this invention.

FIG. 4 is a sectional view on the line 4—4 of FIG. 3.

FIG. 7 is a sectional view of a cylindrical transducer taken through the four pairs of pivotal points and showing the corresponding eight cells.

Figure 2:
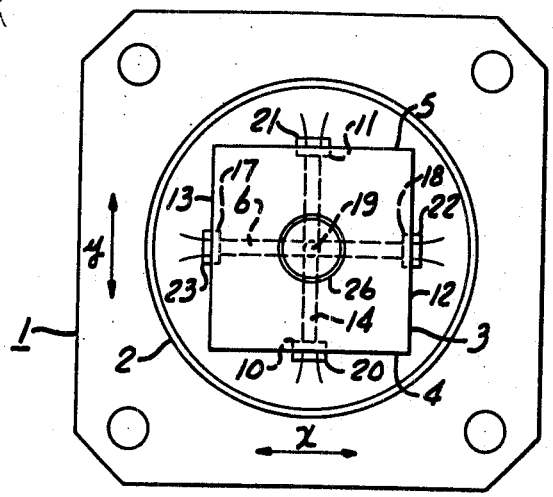
FIG. 2 is a plan view of FIG. 1.
Figure 1:
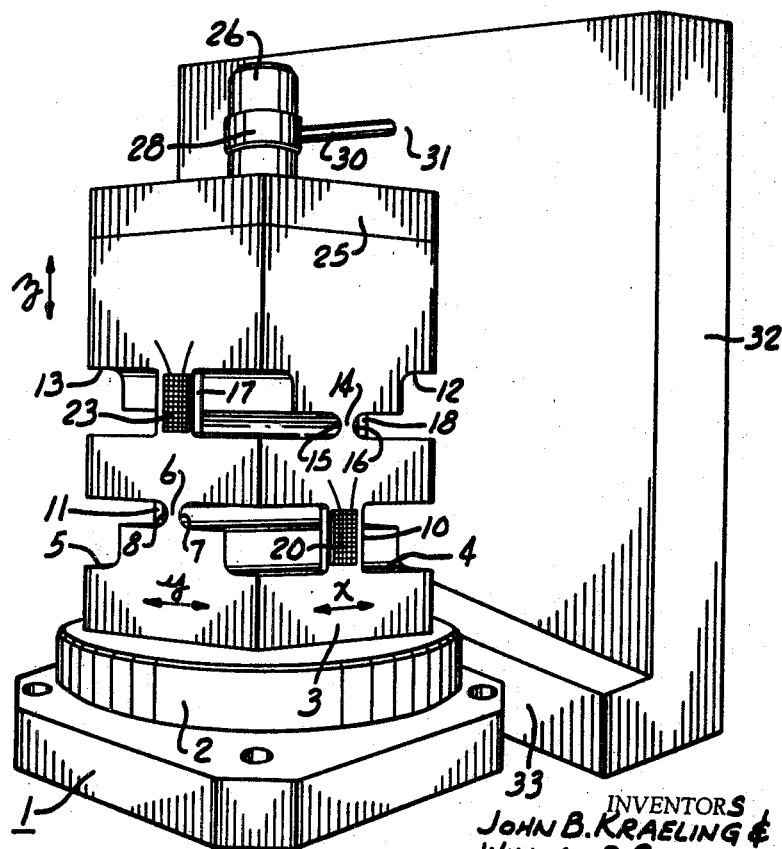
FIG. 1 is a perspective view of a square force measuring transducer comprising one embodiment of this invention.

Referring to FIGS. 1 and 2 of the drawings, the omnidirectional pressure transducer shown therein is provided with a square base 1 having suitable openings for securing the same so that it will be fixed relative to the device to be measured whether the measurement is to be a dimension or a force otherwise produced. The base 1 is provided with an annular pedestal 2 preferably integral with the base and which supports a column 3 which in this instance is square in cross section and is formed integral with the base 1 and the pedestal 2. Let it be assumed that the column 3 has an $x$, $y$ and $z$ axis as indicated on the drawing.

Above the pedestal 2 and in the face of the $x$ axis the column 3 is machined out to form the windows 4 and 5 which are uniformly spaced from each other along the $y$ axis to form the pivot 6 with its oppositely curved surfaces facing outwardly from the pivot in opposite directions. The windows 4 and 5 that form the arcuate pivot 6 for the full $x$ axis dimension of the column 3 provide, as is seen in the drawing, a pivot 6 is an intermediate vertical connection or support member of uniform height and of minimum dimension owing to the back-to-back arcuate surfaces 7 and 8 forming the pivot.

Towards the outer faces of the sides of the column 3 the windows 4 and 5 are formed downwardly leaving intermediate supports 10 and 11. Thus the pivot 6 and the intermediate supports 10 and 11 represent the vertical connection between that part of the column above and below the windows 4 and 5.

Above the windows 4 and 5 are another set of windows spaced along the $z$ axis and indicated at 12 and 13 and formed in the same manner as the previous windows to produce the intermediate vertical connection or support member or pivot section 14 bounded by the back-to-back arcuate sections 15 and 16 in the same manner as the windows therebelow with the exception that the longitudinal axis of the pivot 14 lies at right angles to the longitudinal axis of the pivot 6. In like manner the windows 12 and 13 are provided with the intermediate support sections 17 and 18 that are disposed immediately above the actual centers of the ends of the pivot 6.

This arrangement of the pivots 6 and 14 provide intermediate vertical connections or support members as illustrated in FIG. 2 wherein the small congruent cross section of the two pivots as indicated at 19 represents a small central column in the device which would support a vertical load from the top of the column.

Each of the intermediate vertical support members 10 and 11 and 17 and 18 carry a strain gauge or cell on their outer face. The cell for window 4 is indicated at 20 and the cell for window 5 is indicated at 21, whereas the cell for window 12 is indicated at 22 and the cell for window 13 is indicated at 23. Such a cell may be cemented directly to the outer surface of the metal forming the column 3 and will produce an electric current or change in electric current that is passed therethrough depending upon the character of cell employed. In the case of the strain gauge made up of series of coils of wire fixed in a body and cemented to the supports, the resistance thereof would change in proportion to the strain placed between the top and the bottom of the support whether it be under compression or under tension and would reflect the increase or decrease of current accordingly. Such cells or strain gauges are ordinarily connected in bridge circuits to determine a direct measurement of the forces dealt with in the pressure transducer.

The top of the column 3 is provided with a magnetic armature member 25 which may be of the permanent type or the electromagnetic type and as illustrated in FIG. 1 is provided with an upwardly extending post 26 against which the gauged forces or forces to be measured are applied. A collar such as illustrated at 28 may have different projecting members 30 for the purpose of engaging a track or finish surface 31 on the side of a large member such as a casting 32 that has a finished base 33 for the purpose of measuring variations in the finished surface or track 31. As indicated in FIG. 1 the base 1 would have a finished surface that follows the finished surface 33 of the casting 32 and any difference greater than the dimension of the arm 30 will be reflected in the strain gauge coils 23 as illustrated in FIG. 1. If the surface 31 required a double face, then as the gauges moved therealong, the arm 30 would be provided with a slide to engage opposite sides of the double face and thus both cells 22 and 23 would be brought into play.

Again the base 1 may be bolted and the forces applied thereto in any direction in which case a wheel might be employed on the post 26 for the purpose of measuring the forces from any direction when the base 1 is bolted to a stationary table, in which case the combination of the cells 20 to 23 will provide the measurement and the direction applied to the post 26.

In the structure shown in FIGS. 3 and 4, rather than a column a cylinder or tube 35 is provided on the base 36 which is illustrated in FIG. 4. This cylinder is provided with an inner bore 37 and four windows are cut from the cylindrical surface into this bore as indicated at 38. Each window is divided at its opposite ends by the vertical connection or support member in the form of a pivot point 40 or cut or constructed from a vertical support member or section 41. Thus as viewed in FIG. 3, the pivot member 40 is narrow and is bound on opposite sides by the arcuate outwardly facing surfaces 42 and 43 which terminate to form the top of the window 38 and the support sections 41 on which is placed the strain gauges or cells 44, 45, 46 and 47, respectively.

Each of the two axes at right angles to each other are provided with a pair of aligned pivot members 40. One pair of these pivot members function to actuate the cells 44 and 46, while the other pair of pivot members function to actuate the cells 45 and 47 as shown in FIG. 4. Thus in the cylindrical type column having a central bore four cells or strain gauges may be employed in the same horizontal plane which required two planes, one above the other, as shown in FIG. 1. Although the structure may be compensated and calibrated for the structure of FIG. 1, such is not necessary when all the cells are provided in one horizontal plane as shown in FIGS. 3 and 4.

The cylindrical column 35 has an offset shoulder 48 adjacent its upper end to receive the collar 50 having a frusto-conical surface or socket on its upper inner bore as indicated at 51 which mates with the frusto-conical plug surface 52 of the magnet member 53. One may readily center the magnet 53 by merely raising the sleeve or collar 48 to force this magnetic armature in the centermost position so that its post 54 will always be at the right or axial center of the column 35 for the purpose of measuring. The similar structure to this may be provided for the square column. However, the cylindrical sleeve 50 lends itself to simple construction that may permit one to quickly center the armature member in the axial center of the cylindrical column. Thus when pressure is applied to the post 54, the reading is reckoned from the same position after each operation since the member delivering the force would engage the post 54 at the same position on its cylindrical surface.

Another important factor of this device is that only the support sections 41 actually support the armature member 53 and thus any vertical load on the device will be measured by each of the four cells 44 to 47, whereas the solid stem 19 of FIG. 2 which is in the axial center of the square column 3 is not provided with a strain measuring device and thus would require more compensations than that of the structure of FIGS. 3 and 4 in measuring a vertical load or in fact measuring a vertical load up or down.

Figure 6:
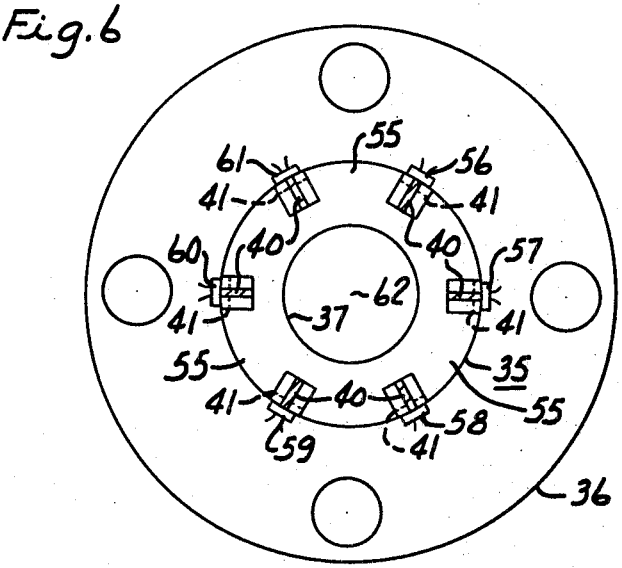
FIG. 6 is a sectional view through the pivot points of FIG. 5.
Figure 5:
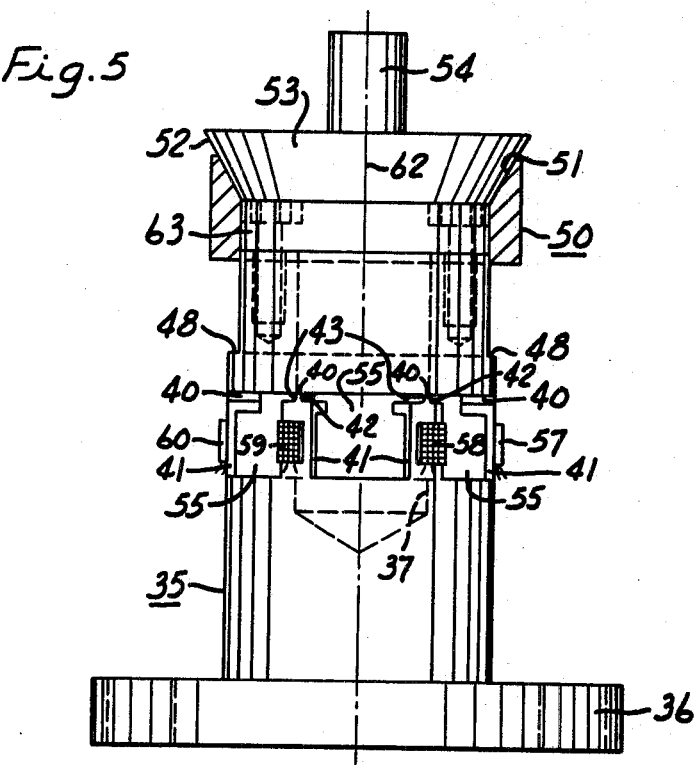
FIG. 5 is a view in side elevation of a cylindrical transducer with three pairs of cells.

In the structure shown in FIGS. 5 and 6 the column 35 is provided with six windows 55 each bound by a support section 41 and a pivot section 40 adjacent thereto. Here again the pivot sections 40 are constructed by the back-to-back arcuate surfaces 42 and 43 of each pivot member 40.

Since the column 35 has six windows and three pairs of pivots, the pivot axis of which are aligned on opposite sides of the hollow cylindrical column, a greater multiple of cells or strain gauges is required and as shown in FIG. 6 they are indicated at 56, 57, 58, 59, 60 and 61, the pairs being 56 and 59, 57 and 60, and 58 and 61. Each of these strain gauges or cells may be connected in an electrical circuit of the bridge type for the purpose of measuring a force in any direction whether it be vertically up or down or in any direction measured from the axial center 62 of the cylindrical column.

As shown in FIG. 5 a plate of magnetic material such as indicated at 63 is bolted or otherwise secured to the top of the column 35 and a similar shoulder of 48 is provided on the exterior of the collar to receive the ring 50 that has a corresponding frusto-conical bore 51 to receive the frusto-conical face 52 of the plug 53. The plug 53 being either a permanent magnetic material or electromagnetic structure with a coil therein is in the nature of a clutch which when energized to a predetermined degree or having a magnetism of predetermined passivity prevents it from being moved until a predetermined force is applied thereto at which time it will slide laterally over the plate 63 when the sleeve 50 is lowered and prevent the destruction of the support sections 41 or their corresponding cells or strain gauges attached thereto. The plate 63 offers a magnetic surface across the open end of the tube or hollow column 35 which is not provided in the same structure as illustrated in FIG. 3. Thus the area engaged by the magnetic force plug 53 can become a factor in determining the clutch action of the same.

Referring now to FIG. 7 which illustrates the cross section of a column such as illustrated at 35 in FIGS. 5 and 6 but having instead of three pairs of aligned pivots has four pairs of aligned pivots wherein the pivots 40 are supported by their respective support sections 41 and form a smaller window 64 between each adjacent pair of pivots. This provides a set of four pairs of cells or strain gauges as indicated at 65, 66, 67, 68, 69, 70, 71 and 72, respectively. This permits the force exerted from the north to the south position of FIG. 7 utilizing the east-west pivot members directly but affecting the strain gauges 65 and 69 principally and subordinately the strain gauges 66 and 68 and the strain gauges 70 and 72. In some installations such a structure may have a material advantage over the three-pair pivot structure of FIGS. 5 and 6 and over the two-pair pivot structure of FIGS. 3 and 4, the latter of which of course provide the greatest flexibility because of the size of the windows 38. Thus each application in which the omnidirectional pressure transducer is employed determines the type or arrangement of the pairs of pivots to be employed and of course the pairs of pivots employed might well determine the position of the cells or strain gauges on each support section 41. The support sections 41 may be provided with a window wherein a crystal type cell sensitive to pressures for the purpose of generating a current or changing a current flow therethrough may be employed to the same purposes as that of a strain gauge as pasted on the outer side of the support section. The windows of course are arbitrarily of greater cost.

Figure 8:
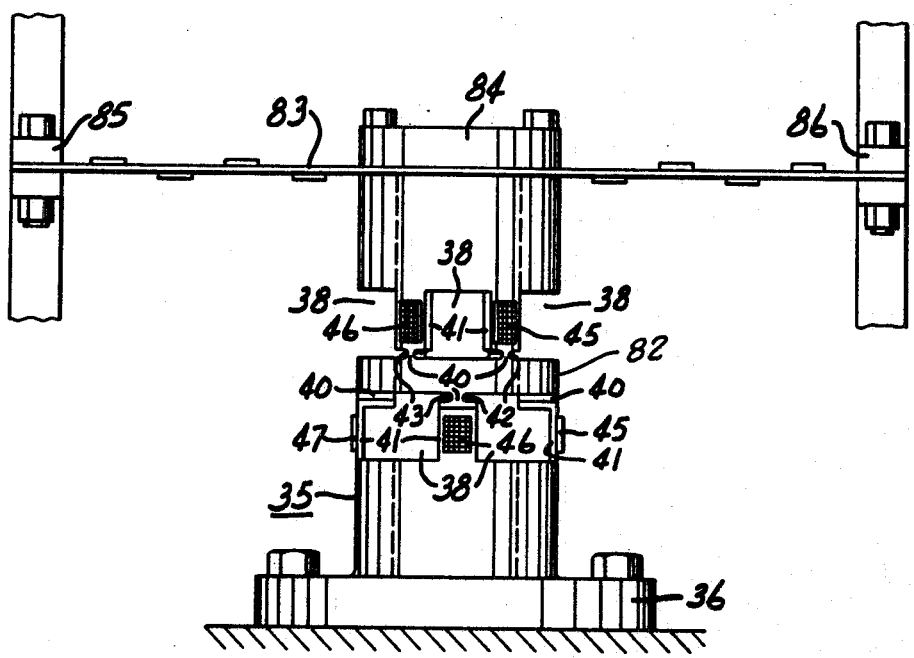
FIG. 8 is a view in side elevation of a diaphragm connection for a mechanical system to transmit forces in any direction to a omnidirectional force transducer having multiple pairs of pivots each with a cell which provide signals for the continued measurements of the amount and the directional factor of changing forces in the system.

Another application of this omnidirectional force transducer is illustrated in FIG. 8 wherein the column 35 is secured to a table or to a common base. The column 35 is provided with four windows 38 each producing an opposite pair of pivots 40 in a manner similar to the structure shown in FIG. 3, since the construction of FIG. 8 employs the cylindrical or tubular column 35 rather than a square and solid column 3. A second and additional set of windows 38 formed by the inverted pivot members 40 are disposed at 45 degrees relative to the pivot 40 on the lower horizontal set of pivots 40, the pivots 40 being connected directly to the intermediate tubular ring 82.

In this structure of FIG. 8 even though there are two sets of pivots which are placed relatively close to each other, or as close as is possible with relation to the structure of FIG. 1, the windows 38 in each level are large and of the same dimension as are the pivot members 40. The choice of large windows in plurality of subjacent tiers as illustrated in FIG. 8 provide greater flexibility when the windows are the same size and also provide a greater sensitivity.

An additional or third tier in this type of pressure transducer could provide windows as shown in FIG. 8 but spaced apart and the windows located at the same relative radial locations but the center tier of windows would require that the pivot members 40 be at opposite ends of the support member 41 each having two pivots 40 and only one cell.

Thus any multiple of tiers of pivot sections would produce structures of four pairs of pivot members as illustrated in FIG. 7 may be accomplished by using three tiers of two pairs each of pivot members 40 the intermediate tier having pivots 40 at opposite ends of the support sections. The advantage of such a structure is that one is permitted to use the larger window lending to greater flexibility and having a similar disposition of the pairs of pivot structures illustrated in FIG. 8 in two tiers. Here again each strain gauge may be connected in a suitable combination of circuits electronically connected together so that they sweep in a microsecond of time to read out and plot the relative direction and the amount of the force applied to the top of this omnidirectional force transducer.

As shown in FIG. 8, this transducer is secured to a diaphragm 83 by the cylindrical cap member 84 and the perimeter of the diaphragm may be secured to an annular series of independent clamps 85 and 86 or to a continuous annular clamp that otherwise connects it to a structure in which the direction and the amount of the vibratory forces may be measured. Such an application of a device of this kind could be an intricate maze of reinforcing members within the fuselage of an airplane wing or the like or to a system through which vibrations are transmitted or received whether they begin or end as sonic vibrations or supersonic vibrations which may be received and read out in a computer type device for the purpose of transmitting mere mechanical vibrations or intelligence.

Figure 9:
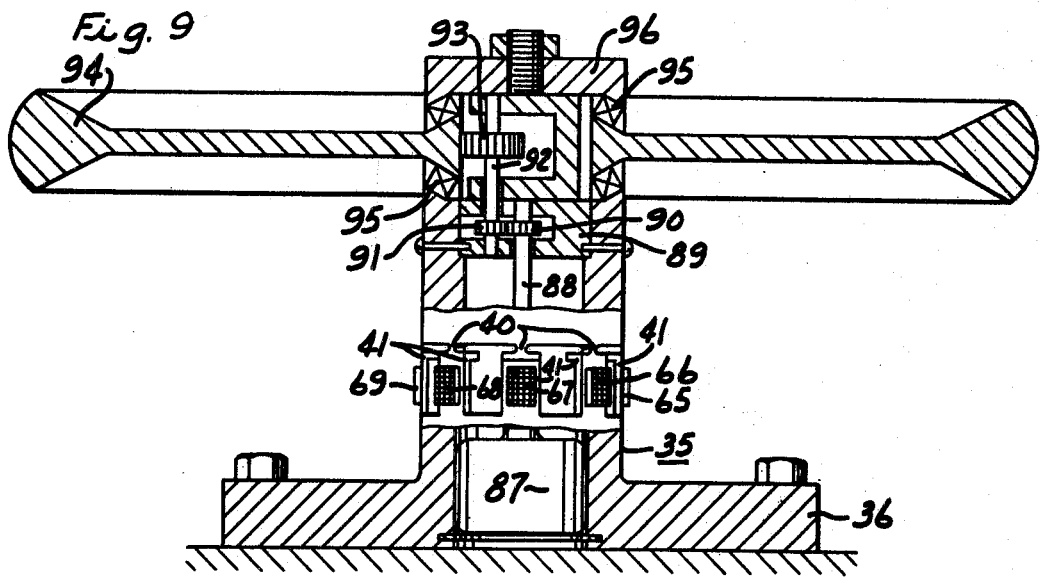
FIG. 9 is a view in side elevation of an omnidirectional force transducer having multiple pairs of pivots each with a cell at different radial positions and supporting a rotary gyroscopic wheel effective on the cells to measure deviating forces.

In the structure shown in FIG. 9 the omnidirectional force transducer illustrated is similar to that provided in FIG. 8 wherein there are four pairs of pivot members 40 in the same plane each with its own support section 41 having a respective strain gauge 65 to 72, inclusive. In the bottom of the bore of this column 35 is mounted a motor 87 having an upwardly extending shaft 88 journaled in suitable needle bearings carried by the block member 89 and provided with a pinion 90 to rotate the larger gear 91 mounted on a suitably journaled jackshaft 92 and having an output pinion 93 to actuate the gyroscopic wheel 94 which is mounted on suitable anti-frictional bearings 95. The top of the plug 89 carries the cover plate 96 to support the upper race of the anti-frictional bearings 95. The base 36 of this omnidirectional force transducer may be securely bolted with its rotary axis in a predetermined direction in a movable body whether it is landborne or airborne and as the gyroscope continues to rotate it will be sensitive to any deviation from its rotary axis and may accurately measure not only the force but its direction whether axial or at an angle to the rotary axis of the gyroscopic wheel 94. This intelligence may then be read out and computed for automatically rectifying any change in course due to the deviation or supply information in regard to the deviation together with its magnitude and duration.

We claim:

1. An omnidirectional pressure transducer comprising a base, a continuous vertical column mounted on said base, a post coaxially mounted on said continuous vertical column for receiving forces, said continuous vertical column having lateral windows extending therethrough, said lateral windows forming vertical column wall connections, selected of said vertical connections carrying transducers at predetermined axes of said continuous vertical column, selected of said vertical connections providing a plurality of flexural pivots, the pivotal axis of each flexural pivot passing through the longitudinal axis of said vertical column and disposed at an angle relative to each other pivotal axis.

2. The omnidirectional pressure transducer of claim 1 characterized in that said windows are disposed in subjacent planes of said continuous vertical column.

3. The omnidirectional pressure transducer of claim 1 characterized in that said windows are disposed in the same plane.

4. The omnidirectional pressure transducer of claim 3 characterized in that said column is a hollow cylindrical body with an annular series of windows separated by said vertical connections each provided with one of said pivots and a transducer.

5. The omnidirectional pressure transducer of claim 1 characterized in that said pivots are disposed in subjacent planes.

6. The omnidirectional pressure transducer of claim 5 characterized in that there are two pivots, and their pivotal axes are at right angles to each other.

7. The omnidirectional pressure transducer of claim 1 characterized in that each of said pivots has two parts disposed diagonally opposite to each other on the same pivotal axis.

8. The omnidirectional pressure transducer of claim 7 characterized in that there are two pivots with their pivotal axes disposed at right angles to each other in same horizontal plane.

9. The omnidirectional pressure transducer of claim 1 characterized in that each of said vertical connections is provided with a pivot connection of gauged cross section and a wider connection to receive said transducer.

10. The omnidirectional pressure transducer of claim 9 characterized in that said gauged pivot connection is provided with aligned arcuate faces disposed back to back.

11. The omnidirectional pressure transducer of claim 9 characterized in that each of said transducers is applied to a surface of said vertical connections which is normal to its respective lateral axis.

12. An omnidirectional pressure transducer comprising a vertical column having a hollow column section with lateral windows interrupted by vertical column wall connections at predetermined lateral axes of the column, transducers on selected of said vertical column connections, selected of said vertical connections providing pivots, the axis of eah pivot disposed normally to the longitudinal central axis of the hollow column.

13. The omnidirectional pressure transducer of claim 12 characterized in that said windows are disposed in subjacent hollow column sections of the column.

References Cited

UNITED STATES PATENTS

| | | | |
|---|---|---|---|
| 2,803,134 | 8/1957 | Ward | 73—141 |
| 2,859,613 | 11/1958 | Green | 73—41 |
| 3,180,139 | 4/1965 | Söderholm | 73—141 |
| 3,217,536 | 11/1965 | Motsinger et al. | 73—147 XR |
| 3,233,452 | 2/1966 | Jones | 73—147 |
| 3,300,745 | 1/1967 | Walter | 73—141 XR |
| 3,365,943 | 1/1968 | Bloch | 73—189 |

CHARLES A. RUEHL, Primary Examiner

U.S. Cl. X.R.

73—141